United States Patent [19]

Loomis et al.

[11] Patent Number: 4,962,608
[45] Date of Patent: Oct. 16, 1990

[54] FISHING ROD

[76] Inventors: Gary A. Loomis, P.O. Box 907, Woodland, Wash. 98674; Allan W. Jackson, 975 Cardon Dr., Rockledge, Fla. 32955

[21] Appl. No.: 290,446

[22] Filed: Dec. 27, 1988

[51] Int. Cl.⁵ .............................................. A01K 87/00
[52] U.S. Cl. ........................................... 43/18.1; 43/22
[58] Field of Search ................... 43/18.1, 18.5, 22, 20, 43/23

[56] References Cited

U.S. PATENT DOCUMENTS

| | | |
|---|---|---|
| 386,320 | 7/1988 | Horton . |
| 2,341,053 | 2/1944 | Mason . |
| 2,537,488 | 1/1951 | Stoner . |
| 2,667,713 | 2/1954 | Stephens . |
| 2,777,240 | 1/1957 | Hutchison ............... 43/22 |
| 2,929,409 | 3/1960 | Waehner ............... 43/18.5 |
| 3,461,593 | 8/1969 | Martuch et al. . |
| 4,214,395 | 7/1980 | Caldwell, Jr. . |
| 4,403,439 | 9/1983 | Wallace . |
| 4,422,259 | 12/1983 | Shimano ............... 43/18.5 |
| 4,582,758 | 4/1985 | Bruce et al. . |
| 4,686,787 | 8/1987 | Whipp . |

FOREIGN PATENT DOCUMENTS

| | | | |
|---|---|---|---|
| 1133203 | 11/1956 | France ..................... 43/22 |
| 0005871 | 4/1887 | United Kingdom ................. 43/22 |
| 1172665 | 12/1969 | United Kingdom ................. 43/18.1 |

*Primary Examiner*—Richard K. Seidel
*Assistant Examiner*—James Miner
*Attorney, Agent, or Firm*—Christensen, O'Connor, Johnson & Kindness

[57] ABSTRACT

A fishing rod (10) is composed of a hollow, unitary handle (14) and blank (12). The rod blank (12) is substantially trapezoidal in cross section, composed of a top wall (40), a wider bottom wall (42) and sloped side walls (44) interconnecting the top and bottom walls. The widths of the top and bottom walls (40,42) are selected so that when a downward force is applied to the tip of the rod (10), the ability of the top wall (40) to carry the resulting tensile load is substantially equivalent to the ability of the bottom wall (42) to carry the resulting compressive load.

15 Claims, 2 Drawing Sheets

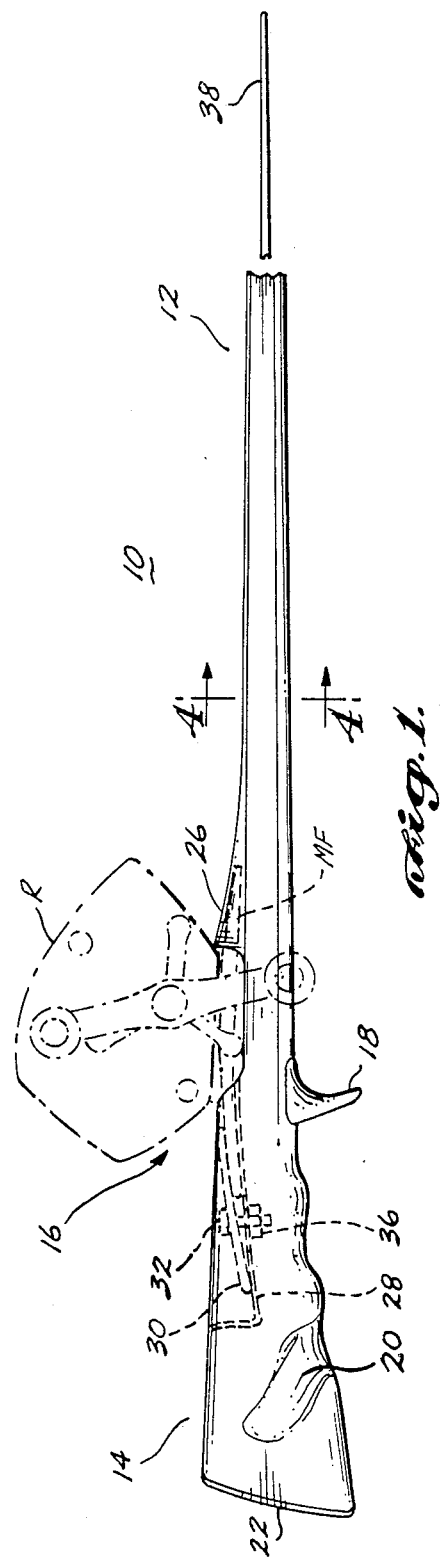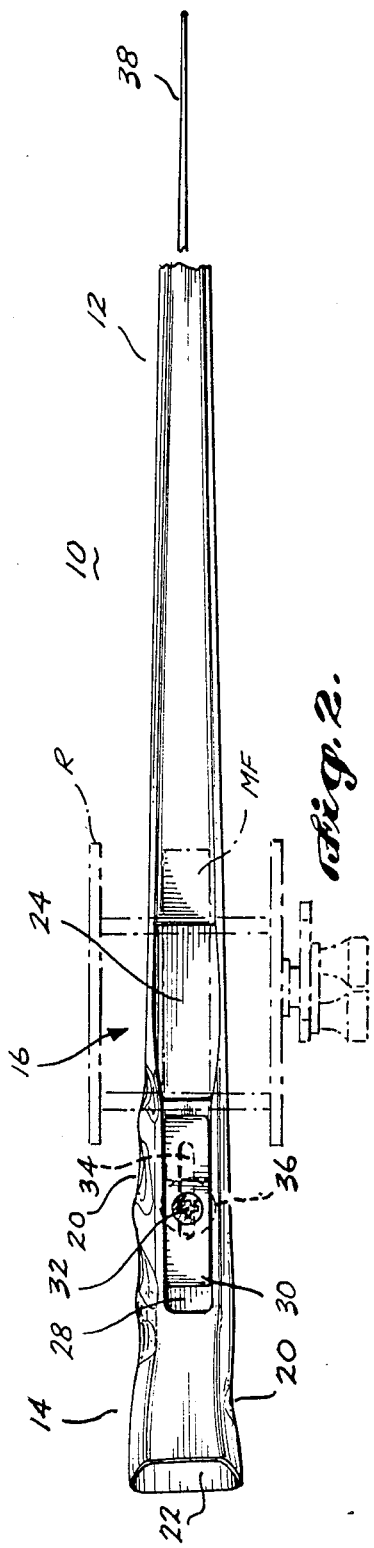

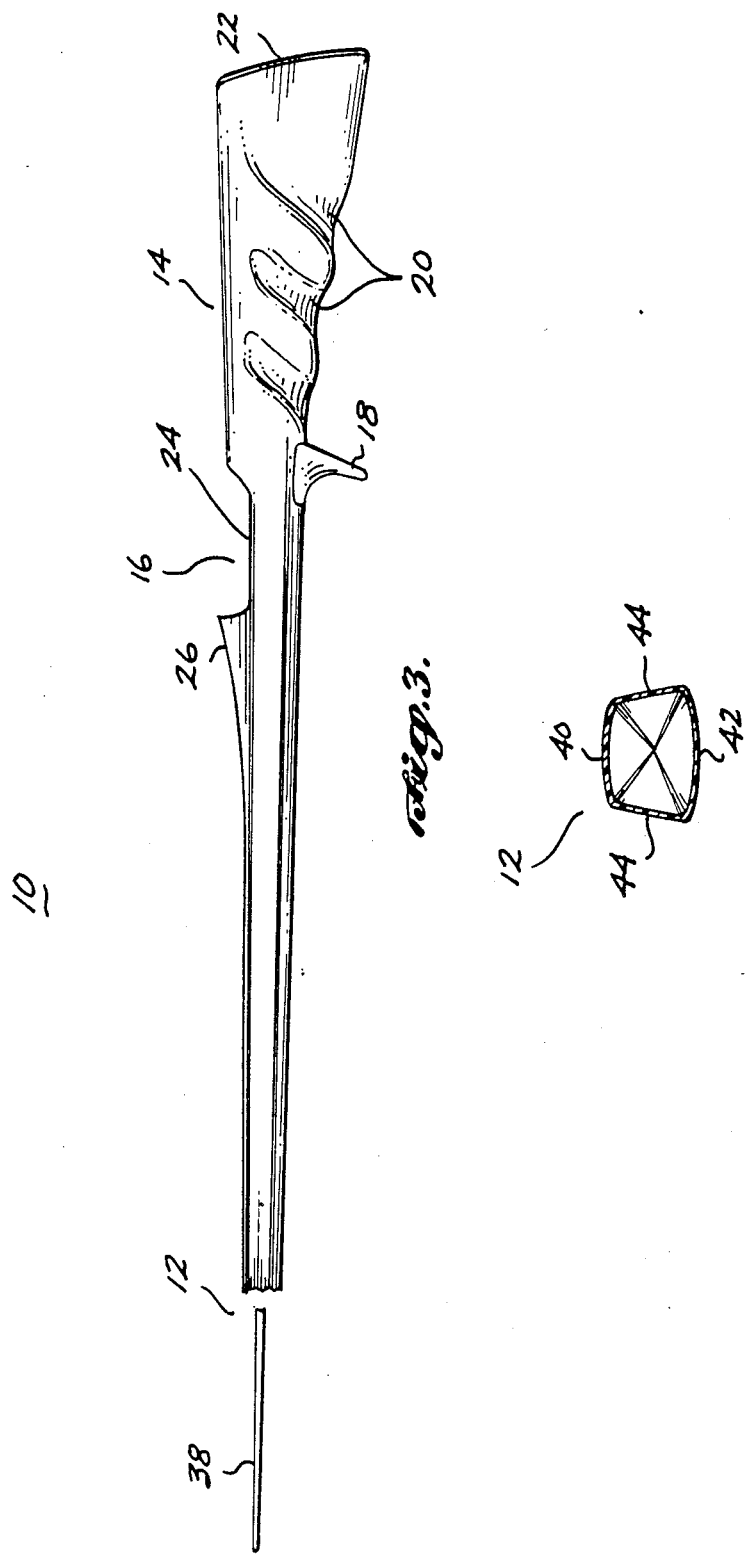
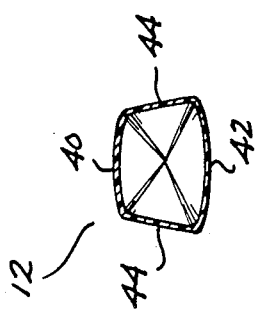
Fig. 3.
Fig. 4.

FISHING ROD

FIELD OF THE INVENTION

This invention relates to fishing rods.

BACKGROUND OF THE INVENTION

Currently, fishing rods are typically constructed from resin reinforced with relatively high-strength, but lightweight materials, for instance, fiberglass and graphite. The blanks of such rods are manufactured by a process of rolling precut, resin impregnated flat patterns of woven fiberglass, graphite or similar materials about a tapered, cylindrical, steel mandrel and then heat curing at an elevated temperature. The steel mandrel is subsequently withdrawn, providing a flexible, tapered fiber-reinforced resin rod blank having a hollow core. Heretofore, this manufacturing procedure has dictated that fiber-reinforced rods are formed circular in cross section corresponding to the tapered, cylindrical shape of the mandrel.

Modern fishing rods of the foregoing construction are substantially lighter weight and stronger per unit weight than prior rod designs, including metallic tubular rods, split bamboo rods of both hollow and solid core construction and cane poles. Advantages of the lighter weight rods are that they result in less fatigue to the fisherman and also provide more sensitivity to allow the fisherman to better feel the presence of a fish. Contemporary fishing rods composed of high strength materials are also strong enough to enable the rods to withstand the stresses placed on the rods during use, especially by a hard fighting fish and durable enough to accommodate rough handling. Moreover, such rods require very little, if any, maintenance. However, one common drawback of such rods, especially those composed of fiberglass or graphite-reinforced resin, is that they exhibit a relatively low resistance to torsional loads. Thus, such rods are subject to excessive twisting during use, which can result in premature failure of the rod.

Another drawback of current rods, and for that matter of any rod of cylindrical construction, is that greater material is employed in certain portions of the rod than is actually necessary to carry the loads imparted on the rod during use. Most materials, and in particular graphite and fiberglass, are capable of withstanding much higher tensile stresses than compressive stresses. When a rod is bent under the load of a fish, the upper surface or section of the rod is loaded in tension whereas the bottom section or surface of the rod is loaded in compression. Due to the uniform thickness of the wall of the rod blank at any location along the length of the rod, the rod must be constructed with sufficient material to enable the lower portion of the rod to carry the compressive load imposed thereon when the rod is bent downwardly by a fish pulling on the line. As such, the rod utilizes more material along its upper surface, and also perhaps along its side surfaces, than is actually required to carry the loads imposed on these surfaces. This results in a heavier, less sensitive fishing rod than would exist if the rod were designed more precisely to match the amount of material at various cross-sectional locations with the capacity of the rod blank to carry stress loads at such locations. Thus, current cylindrical rods, including those composed of fiberglass or graphite-reinforced resin, are heavier (and, thus, less sensitive) than needed to carry the loads imposed on the rod. This also results in a rod that is more expensive to manufacture than actually required, due to the relatively high cost of the rod material, especially high strength, woven graphite fabric material.

In the past, fishing rods have been designed in shapes other than cylindrical, for instance, split bamboo rods are typically hexagonal in shape. See, for example, U.S. Pat. No. 2,537,488. Fishing rods also have been constructed in hexagonal and other polygonal shapes for various purposes, including to prevent the rod from collapsing when subjected to a bending load and also to permit the rod to bend more in one direction than another. See, for instance, U.S. Pat. Nos. 4,582,758 and 4,686,787.

Another further drawback of conventional rods is that the rod blank and handle are typically separately formed and then attached together, for instance, mechanically or with an adhesive. The joint between the blank and the handle results in a discontinuity in the rod structure. Discontinuities also occur if ferrules or other types of joints are utilized to interconnect longitudinal sections of the rod. These structural discontinuities result in an uneven transfer of power from the handle of the rod being held by the fisherman to the tip of the rod so that not significantly less than all of the power being applied to the rod by the fisherman during casting is actually transmitted to the rod tip. As a result, the distance that a fisherman can cast is less than if a rod were constructed without discontinuities so that the power of the cast is transmitted uniformly and efficiently throughout the entire length of the rod.

SUMMARY OF THE INVENTION

The foregoing drawbacks of current fiber-reinforced rods are addressed by the present invention, which provides a hollow rod blank for a fishing rod, wherein the rod blank is trapezoidal in cross section. The rod blank is composed of a top wall and a wider bottom wall interconnected by sloped side walls. The relative widths of the top and bottom walls are selected so that when a downward load is applied to the tip of the rod blank, the ability of the rod blank to carry the resulting tensile load along the top wall is substantially equivalent to the ability of the rod blank to carry the resulting compressive load along the bottom wall. Although the top and bottom walls may be substantially flat in the direction across the rod blank, they also may be somewhat bowed outwardly to enhance the hoop strength and torsional strength of the rod blank.

In a further aspect of the present invention, the foregoing hollow rod blank is integrally and simultaneously formed with a hollow handle to provide a unitary fishing rod. This rod design eliminates structural discontinuities along the length of the rod, especially at the juncture between the blank and the handle. As a result, the power being applied to the rod by a fisherman during casting is uniformly transferred along the rod to the tip to maximize casting distance. In addition, vibrations imparted by a load acting at the tip of the rod are transmitted along the rod to the handle without any significant attenuation.

BRIEF DESCRIPTION OF THE DRAWINGS

A preferred embodiment of the present invention is illustrated in the accompanying drawings, in which:

FIG. 1 is a side elevational view of a fishing rod of the present invention illustrating a reel mounted thereon;

FIG. 2 is a top view of the fishing rod illustrated in FIG. 1;

FIG. 3 is a side elevational view of the opposite side of the rod shown in FIG. 1; and, FIG. 4 is a cross-sectional view of the rod blank taken substantially along lines 4—4 of FIG. 1.

DETAILED DESCRIPTION

Initially referring to FIG. 1, a reel R is illustrated as mounted on a rod 10 constructed according to the present invention. The rod 10 includes an elongated, forwardly tapered blank 12 and an integral rearward handle 14. A reel seat 16 is disposed between the handle 14 and the blank 12. Also, a trigger 18 depends downwardly from the underside of a forward portion of the handle 14.

The handle 14 is tapered in the forward direction and is contoured along its bottom and sides to define a plurality of handle grips 20 which conform to the shape of the human hand and thereby facilitate a comfortable yet firm grip. The handle 14 is of hollow construction and is integrally molded with the blank 12 to form a unitary structure therewith. By this construction, the handle 14 is very light in weight and eliminates any structured discontinuities in the rod which would necessarily occur if the blank 12 and the handle 14 are manufactured as separate components and then joined together with mechanical fasteners, adhesives or by other techniques.

A plug member 22 is shaped to match a rear opening in the butt of the handle 12, and is inserted into such opening to form a continuous, watertight seal. The plug member 22 can be made from any suitable material such as plastic, rubber or cork. Alternatively, the plug could be of the same material composition as the rod 10 which, as discussed below, preferably is composed of lightweight but high strength materials, for example, resin-reinforced fiberglass, graphite, or boron.

A trigger 18 depends downwardly from the forward, underside portion of the rod handle 14, and is positioned forwardly of the handle grips 20 to support one or more fingers (typically the forefinger or middle finger) of the user's hand and thereby facilitates a firm grip of the rod 10. To minimize the weight of the rod 10, the trigger 18 ideally is of hollow construction. The trigger can be formed from the same material as the composition of rod 10 or from other high strength but lightweight materials. The trigger 18 can be integrally molded with the rod 10 or formed separately and then attached to the rod by any convenient method, such as with a threaded fastener, not shown, or suitable adhesive.

Between the handle 14 and rod blank 12 is a reel seat 16, which is formed at an elevation below the top surface of the rod. The reel seat 16 includes a longitudinal opening 24 for reception of the forward and central portions of the mounting flange MF of the reel R. The top surface of the butt portion of the blank 12 rises upwardly from the hollow blank at the forward edge of the reel seat 16 to form a rearwardly rising hood 26 at the front of the opening 24 of the reel seat, to engage over the forward tang of the reel mounting flange MF.

An elongated, shallow, flat, recessed track 28 is formed in the upper forward portion of the handle 14 to receive and support the rear tang of the reel mounting flange MF. A thin, flat, rectangular slide plate 30 is sized to closely fit within the track 28. The slide plate 30 is adapted to engage over the rear tang of the reel flange to sandwich the rear tang between the track and the slideplate. A threaded fastener 32 extends downwardly through an opening formed in the slideplate, through an elongated slot 34 extending centrally along the track 28 to engage with a step nut 36 disposed beneath the track. The step nut 36 is formed with a square shoulder portion that is sized to closely and slidably fit within the slot 34 to prevent the nut from rotating, especially as fastener 32 is tightened or loosened. As will be appreciated, by the foregoing construction, the slide plate 30 may be conveniently moved along the track 28 as required to overlie the top of the rear tang of the reel mounting flange MF, thereby to securely hold the rear tang stationary relative to the track while at the same time, the front tang of the mounting flange is pressed against the underside of the hood 26.

The rod blank 12 is tapered in the forward direction from the handle 14 to the tip 38 of the rod 10. Moreover, as shown in FIG. 4, the rod blank 12 in cross section is formed in a substantially trapezoidal shape, with a top surface or wall 40 that is narrower in width than a bottom surface or wall 42. Sloped side walls 44 interconnect the top and bottom walls 40 and 42. Ideally, the relative widths of the top and bottom walls 40 and 42 are selected so that when a downward load is applied to the rod tip 38 (with the rod in "standard" orientation, i.e., the reel seat 16 positioned upwardly and the trigger 18 positioned downwardly), the capacity of the top wall 40 to carry the resulting tensile load is matched with the capacity of the bottom wall 42 to carry the resulting compression load. Since most commonly utilized materials for producing fishing rods, such as fiberglass and graphite, are capable of accommodating much higher tensile stresses than compressive stresses, the width of the bottom wall 40 is commensurately wider than the width of the top wall. For example, graphite is capable of carrying a tensile load of about 33 to 34 million psi and a compressive load of about 500,000 psi. In this situation, the width of the bottom wall ideally is about 20% wider than the width of the top wall.

Although the top and bottom walls 40 and 42 of rod 10 may be planar or flat, as shown in FIG. 4, ideally, they are slightly rounded for increased hoop strength and to enhance the ability of these walls to carry torsion loads. Likewise, the side walls 44 of the rod blank may also be bowed slightly outwardly.

It will be appreciated that, through the present invention, the heights of the side walls 44 of the rod blank relative to the widths of the top and bottom walls 40 and 42 may be chosen to give the rod 10 different bending characteristics in the side-to-side direction as opposed to the up-and-down direction. For instance, if desired, rod 10 could be made stiffer in the lateral, or side-to-side, direction relative to the up-and-down direction, by constructing the rod blank so that the heights of the side walls 44 are shorter than the widths of the top and bottom walls 40 and 42. As a result, the rod 10 will be relatively stiff in the lateral direction, for instance to permit increased casting distance, but less stiff in the up-and-down direction, to provide enhanced sensitivity to enable the fisherman to better "feel" the presence of a fish.

Fishing rods, including fishing rod 10 of the present invention, are tapered in the direction from the butt to the tip of the blank. In the present invention, to maintain the matched load-carrying capabilities of the top wall 40 and the bottom wall 42, the taper rate of the top and bottom wall is different for each. As a non-limiting example, the rate of taper for the top wall 40 may be from about 0.003 to 0.030 inch of taper across the width of the top wall for each inch along the length of the top wall, with a preferred taper rate of about 0.003 to 0.015 inch of taper across the width of the top wall for each inch along the length of the top wall. Also, an illustrative but not limiting example of a range of taper of the bottom wall 42 may be approximately from 0.003 to 0.020 inch per longitudinal inch of the bottom wall, with a preferred taper rate of about 0.003 to 0.015 inch per longitudinal inch of the bottom wall. Applicant has found that, for the foregoing taper rates of the top and bottom surfaces, a desirable range of taper rate for the side walls 44 may be approximately from 0.003 to 0.025 inch per longitudinal inch of the side walls, with a preferred range of approximately 0.003 to 0.015 inch per longitudinal inch of the side walls. This provides the blank 10, having a length of approximately 7 feet, with the desired feel and action to enable the rod to be used to cast a bait accurately and to relatively long distances, while at the same time minimizing the weight and maintaining the sensitivity of the rod.

It is also to be understood that, rather than having a constant taper along the lengths of the top, bottom and side walls of the blank 12, the taper rates of each of these walls may vary along their lengths to impart desired characteristics to the rod. Also, because of its relatively small cross-sectional size, it may not be practical to form the tip portion of rod blank 10 in a trapezoidal shape, thus near tip 38 the rod blank may transition from trapezoidal to round in cross section. This would not result in increasing the weight of the rod significantly in comparison to a trapezoidal cross section of the tip 38, since near the tip 38, the rod blank is much smaller in cross-sectional size due to the reduction in the bending movement imposed on the tip 38 relative to the level of the bending moment imposed on the butt of the blank 12.

Although not essential, ideally, rod 10 is constructed from high strength, lightweight material, such as resin-impregnated fiberglass, boron or graphite. These materials may be obtained in woven fabric form and cut into patterns of desired shapes. The patterns may then be wrapped over a mandrel and then placed in an oven at an elevated temperature to heat cure the resin to form rod 10 with an integral blank 12 and handle 14, and with the blank 12 formed in a trapezoidal cross section. Thereafter, the cured rod 10 is slidably removed from the mandrel. Next, if molded separately, trigger 18 is attached to the rod and plug 22 is disposed within the rear opening of the handle 14 to close off the opening.

It can be appreciated that by utilizing the foregoing manufacturing technique, the wall thickness of blank 12 and handle 14 may be varied as desired by utilizing fabric materials of various thickness and also by overlapping the fabric patterns, thereby accommodating various design criteria, such as the desired cross sectional size of the rod blank, the desired action of the rod, or the length of the rod. For a rod of about six to eight feet, ideally the wall thickness of the rod blank 12 is from about 0.015 to about 0.020 inch thick at the tip, about 0.030 to 0.045 inch thick at the butt, and the wall thickness of the handle 14 is ideally from about 0.020 to about 0.030 inch thick.

It will be appreciated that one of the many advantages of forming the rod 10 of the present invention with a blank 12 having a trapezoidal cross section is that this results in the use of a minimum amount of lightweight, high-strength material such as graphite, which lowers the weight of the rod and adds to the user's ability to feel when and if a fish is on the line. Further, constructing the rod blank 12 and handle 14 as a singular structure enables vibrations from loads applied to the tip of the rod to be more readily transmitted through the rod blank and to the handle without attenuation. An integral handle and rod blank also affords the rod greater strength, since there are no breaks along the length of the rod to weaken the overall constitution of the rod.

While the present invention has been described with reference to a specific embodiment, the foregoing description is only illustrative of the present invention and is not to be construed as limiting the invention. Various modifications and applications may occur to those skilled in the art without departing from the true spirit and scope of the invention as defined by the following claims.

The embodiments of the invention in which an exclusive property or privilege is claimed are defined as follows:

1. A fishing rod assembly comprising a hollow rod blank having a tip end and a butt end, the rod blank comprising top and bottom walls interconnected by sloped side walls sized to define a substantially trapezoidal cross section, whereby when a force is applied to the tip of the blank in the downward direction, the ability of the rod blank to accommodate the resulting tensile load along the top wall is substantially equivalent to the ability to accommodate the resulting compressive load along the bottom wall.

2. The fishing rod assembly according to claim 1, wherein the top and bottom walls are substantially flat in the direction across the rod blank.

3. The fishing rod assembly according to claim 1, wherein the top and bottom walls are somewhat bowed outwardly in the direction across the rod blank.

4. The fishing rod assembly according to claim 1, wherein the width across the top and bottom walls and the heights of the side walls of the rod blank are selected to exhibit a different level of resistance to bending loads in the side-to-side direction relative to the up-and-down direction.

5. A fishing rod assembly comprising a handle and a rod blank, said rod blank having a top wall, a bottom wall wider in cross section than the top wall, and side walls interconnecting the top and bottom walls, said top, bottom, and side walls cooperatively defining a substantially trapezoidal cross section, whereby, when a downward force is applied to the tip of the rod, the ability of the top wall to carry the resultant tensile load along the top wall is substantially equivalent to the ability of the bottom wall to carry the resultant compressive load along the bottom wall.

6. The fishing rod assembly according to claim 5, wherein the top and bottom walls are substantially flat in the direction across the rod blank.

7. The fishing rod assembly according to claim 5, wherein the top and bottom walls are somewhat bowed outwardly in the direction across the rod blank.

8. The fishing rod assembly according to claim 5, wherein the width across the top and bottom walls and the heights of the side walls of the rod blank are selected to cause the rod blank to exhibit a different level of resistance to bending loads in the side-to-side direction relative to the up-and-down direction.

9. The fishing rod assembly according to claim 5, constructed from a woven fiber material selected from the group consisting of graphite fibers, fiberglass fibers, and boron fibers.

10. The fishing rod assembly according to claim 5, wherein the rod blank tapers from its butt end to its tip end, wherein the rate of taper along the rod is from about 0.003 to about 0.015 inch in width per longitudinal inch along the top wall, and about 0.003 to 0.015 inch in width per longitudinal inch along the bottom wall.

11. The fishing rod assembly according to claim 10, wherein the rate of taper of the side walls of the rod blank is about 0.003 to about 0.015 inch in width per inch in length along the lengths of the side walls.

12. The fishing rod assembly according to claim 5, wherein a trigger depends downwardly from the underside of the handle for reception of a finger, thereby facilitating a secure grip of the rod.

13. The fishing rod assembly according to claim 5, further comprising a reel seat formed in the upper portion of the rod at the juncture of the handle and rod blank for receiving the base of a fishing reel, said reel seat comprising:
 (a) an opening formed in the upper portion of the rod at the juncture of the handle and rod blank;
 (b) a hood rising upwardly in the rearward direction at the butt portion of the rod blank to intersect the reel seat opening;
 (c) a landing formed at the rear of the reel seat opening and recessed below the upper surface of the rod to receive one end of the base of the reel; and,
 (d) means for clamping the reel base to the recessed landing, whereby the opposite end of the reel base bears against the underside of the reel seat hood.

14. The fishing rod assembly according to claim 13, wherein the reel seat landing comprises a slideway, and wherein the clamping means comprises a slide lever and means for sliding the slide lever forwardly to overlie the base of a reel mounted on the reel seat and rearwardly away from the reel base to permit removal of the reel from the reel seat.

15. The fishing rod assembly according to claim 5, wherein the handle is contoured to define finger-receiving depressions to facilitate a secure grip of the rod handle.

* * * * *